United States Patent [19]

Efron et al.

[11] Patent Number: 5,732,211
[45] Date of Patent: Mar. 24, 1998

[54] ADVANCED DATA SERVER HAVING A PLURALITY OF RINGS CONNECTED TO A SERVER CONTROLLER WHICH CONTROLS THE RINGS TO CAUSE THEM TO RECEIVE AND STORE DATA AND/OR RETRIEVE AND READ OUT DATA

[75] Inventors: Edward Efron, North Tarrytown, N.Y.; Mark Leon Ostlund, South Jordan, Utah

[73] Assignee: Philips Electronics North America Corporation, New York, N.Y.

[21] Appl. No.: 641,153

[22] Filed: Apr. 29, 1996

[51] Int. Cl.$^6$ ................... G06F 3/00; G06F 7/00
[52] U.S. Cl. ................... 395/200.3; 395/200.81; 395/200.82; 395/800.1; 395/800.11; 395/800.15; 370/403; 370/404; 370/405; 370/406; 370/452; 370/460
[58] Field of Search ................... 395/200, 250, 395/200.55, 200.79–200.82, 800.1, 800.11, 800.16, 800.18, 800.19, 851; 370/345, 455, 468, 223, 403–406, 452, 460; 345/6, 8, 12; 455/4.2, 3.1, 5.1

[56] References Cited

U.S. PATENT DOCUMENTS

| | | | |
|---|---|---|---|
| 5,041,963 | 8/1991 | Ebersole et al. | 370/407 |
| 5,251,213 | 10/1993 | Videlock et al. | 370/403 |
| 5,262,965 | 11/1993 | Punam et al. | 395/101 |
| 5,365,518 | 11/1994 | Noser | 370/395 |
| 5,388,097 | 2/1995 | Bangheo et al. | 370/455 |
| 5,438,614 | 8/1995 | Rozman et al. | 379/93.08 |
| 5,592,484 | 1/1997 | Albano et al. | 370/452 |
| 5,594,924 | 1/1997 | Ohesen et al. | 345/851 |
| 5,642,151 | 6/1997 | Nusbickel et al. | 348/6 |

*Primary Examiner*—Parshotam S. Lall
*Assistant Examiner*—Bhasat Basot
*Attorney, Agent, or Firm*—Michael E. Belk

[57] ABSTRACT

An advanced data server including an I/O ring coupled to at least one I/O access channel which provides data to the I/O ring or reads data out from the I/O ring; a disc array ring coupled to least two disc arrays which store therein data received from the disc array ring or retrieve therefrom data for receipt by the disc array ring, the disc array ring also being coupled to the I/O ring so that data can flow between those rings; and a server controller coupled to the I/O ring and the disc array ring for controlling the operations thereof. The I/O ring includes a first ring controller which controls receipt of data from the I/O access channel and transfer of that data to the disc array ring, or receipt of data from the disc array ring and transfer of that data to the I/O access channel. The disc array ring includes a second ring controller which controls receipt of data from the I/O ring and storage of that data among the disc arrays, or retrieval of data from the disc arrays and transfer of that data to the I/O ring. The second ring controller causes data which is received by the disc array ring to be striped across active and available disc arrays coupled to the disc array ring so that different data portions are received by and stored on different ones of the disc arrays, and stores information indicating which data portion are stored on which disc arrays. Each of the disc arrays includes an array controller and at least two disc drives, which array controller causes the data portions received by that disc army to be striped across active and available disc drives included in that disc array so that different data sub-portions of those data portions are stored on different ones of those disc drives, and stores information indicating which data sub-portions are included on which disc drives. The disc array ring and the array controllers use the information stored therein to retrieve the data stored on the disc arrays and the disc drives included therein. A server system includes at least one server and a server operation controller which causes the server to receive/store data or retrieve/read out data.

35 Claims, 3 Drawing Sheets

ADVANCED DATA SERVER HAVING A PLURALITY OF RINGS CONNECTED TO A SERVER CONTROLLER WHICH CONTROLS THE RINGS TO CAUSE THEM TO RECEIVE AND STORE DATA AND/OR RETRIEVE AND READ OUT DATA

BACKGROUND OF THE INVENTION

1. Field of the Invention

The invention relates to an advanced data server and a server system including a plurality of such servers. More particularly, the invention relates to an advanced data server capable of receiving and storing data (such as audio, video, textual and/or computer data) and/or retrieving and reading out such data once stored, which server is easily expandable; and server systems, including such servers, which are also easily expandable.

2. Description of the Related Art

As the information age continues to move forward, and the information superhighway begins to take shape, the need for advanced data servers (e.g., video servers) and server systems which can store and retrieve even larger quantities of information at even faster rates than before will continue to grow. Accordingly, it will be both beneficial and extremely advantageous for such servers and server systems to be easily expandable, i.e., such servers should be able to be expanded to include additional storage components and/ or additional I/O (input/output) access channels, and such server systems should be able to be expanded to include additional servers in a manner which does not affect the ability of such servers or server systems to continue to operate normally during and after such expansion.

The Media Pool video server introduced by a Philips subsidiary/division in the early 1990s revolutionized the video server market by enabling large quantities of audio, video, textual and/or related data to be quickly stored and retrieved by one or more users. That video server employs a plurality of I/O access channels and a plurality of disc arrays coupled together by means of a commutator. Audio, video, textual and/or related data (or computer data or any combination thereof) pertaining to a movie, program or the like (hereinafter referred to as a "program") is received from an I/O access channel and stored in the plurality of disc arrays by means of the commutator supplying different portions of that data to different ones of the disc arrays, i.e., the data is striped across the arrays. Further, the data supplied to each disc array is striped across the disc drives (which each include at least a disc therein) in that disc array. This distribution of data allows the data pertaining to a particular program to be retrieved by the commutator and supplied to one or more users (substantially simultaneously), via one or more I/O access channels, in a fast and efficient means which reduces delays caused by disc latency and mains high bandwidth.

For a further discussion of the Media Pool video server, reference is made to U.S. patent application Ser. Nos. 08/125,996, filed Sep. 23, 1993, now U.S. Pat. No. 5,539,660, and 08/389,672, filed Feb. 16, 1995, now U.S. Pat. No. 5,671,385, which are incorporated herein by reference. For a further discussion of striping across disc arrays and disc drives within disc arrays (the combination of which is hereinafter referred to as "hierarchial/double striping"), reference is made to U.S. patent application Ser. No. 08/530,041, filed Sep. 19, 1995, which is incorporated herein by reference.

A problem with the Media Pool video server is that it is not easily expandable. If additional disc drives and/or disc arrays are added to a Media Pool video server, then a "rebuild" operation must be preformed. What that means is that the data stored in the Media Pool video server must be read out of the server and restored via hierarchial/double striping among the expanded storage components. More specifically, the data which was contained on the original disc arrays and the disc drives contained therein must be re-striped, via hierarchial/double striping, among both the original and newly added disc arrays and the original and newly added disc drives contained therein. As a result of this re-build operation, a Media Pool video server must go off line during the expansion operation. In addition, if additional I/O access channels are added to a Media Pool video server, it must once again be brought off line to be re-configured for such additional I/O access channels. Still further, additional I/O access channels can affect the bandwidth of the Media Pool video server.

SUMMARY OF THE INVENTION

The invention overcomes the above-mentioned problems of the current Media Pool video server, while maintaining its beneficial use of hierarchial/double striping to reduce disc latency and maintain high bandwidth, by employing a high speed ring architecture involving use of one or more separate rings coupled to I/O access channels and disc arrays. This architecture includes use of an intelligent ring controller in each ring for (a) controlling the receipt and/or distribution of data received by that ring and (b) utilizing information about (i) how many and/or which I/O access channels or disc arrays (and the quantity of disc drives included in each) are coupled to and available to that ring at any time and/or (ii) where data is stored as a result thereof in the controlling such receipt and/or distribution. This architecture further includes means for coupling the one or more rings which are used with the I/O access channels to the one or more rings which are used with the disc arrays so that data can be transferred between those rings. These features allow a server in accordance with the invention to be easily expandable; and, in turn, a server system, including one or more of such servers, to be easily expandable as well.

An advanced data server in accordance with the invention comprises: (a) an I/O ring coupled to at least one I/O access channel which provides data to the I/O ring or reads data out from the I/O ring; (b) a disc array ring coupled to least two disc arrays which store therein data received from the disc array ring or retrieve therefrom data for receipt by the disc array ring, the disc array ring also being coupled to the I/O ring so that data can flow between those rings; and (c) a server controller coupled to the I/O ring and the disc array ring, which server controller controls the I/O ring and the disc array ring to cause them to receive and store data or retrieve and read out data. In further accordance with the invention, the I/O ring includes a first ring controller which controls (a) receipt of data from the at least one I/O access channel and transfer of that data to the disc array ring, or (b) receipt of data from the disc array ring and transfer of that data to the at least one I/O access channel; and the disc array ring includes a second ring controller which controls (a) receipt of data from the I/O ring and storage of that data among the at least two disc arrays, or (b) retrieval of data from the at least two disc arrays and transfer of that data to the I/O ring. (It is noted that the ring controllers can operate in a manner whereby the need for the server controller could be eliminated.)

In accordance with one aspect of the invention, the second ring controller may (a) operate in a manner whereby when the disc array ring receives a packet of data, it makes an assessment as to how many disc arrays are coupled to the disc array ring and which of those disc arrays are active and available, there being at least two disc arrays which are active and available at any given time, and on that basis, strips that data across the active and available disc arrays so that different data portions of that packet of data are received by and stored in different one of those disc arrays, and (b) store information indicating which data portions are stored in which disc arrays. Still further, at least one of the active and available disc drives may include an array controller and at least two disc drives, and the array controller may (a) operate in a manner whereby when it receives a data portion, it makes an assessment as to how many disc drives are included in that active and available disc array and which of those disc drives are active and available, there being at least two active and available disc drives at any given time, and on that basis, causes that data portion to be striped across the active and available disc drives so that different data sub-portions of that data portions are stored in different ones of those disc drives, and (b) store information indicating which data sub-portions are stored in which disc drives.

In accordance with another aspect of the invention, different data portions of the data are stored in different ones of the at least two disc arrays, and the second ring controller may store information indicating which data portions of the data are stored in which of the at least two disc arrays. Still further, at least one of the at least two disc arrays may include at least two disc drives in which different sub-portions of the data portions which are stored in that at least one disc array are stored, and that at least one disc array may further store information indicating which data sub-portions are stored in which of the at least two disc drives.

A server system in accordance with the invention comprises: (a) a server of the type described above and (b) a server operation controller coupled to the server controller, which server operation causes the server to receive and store data or retrieve and read out data on the basis of a user request indicating whether a user wishes to receive and store data or retrieve and read out data. That system may further comprise at least one user interface devices coupled to the server operation controller, which user interface device generates the user request.

BRIEF DESCRIPTION OF THE DRAWINGS

The invention (and additional aspects thereof) will be described in greater detail hereinafter with reference to the accompanying drawings, in which.

(Like reference numbers denote like elements.)

DESCRIPTION OF THE PREFERRED EMBODIMENTS

Figure 1:
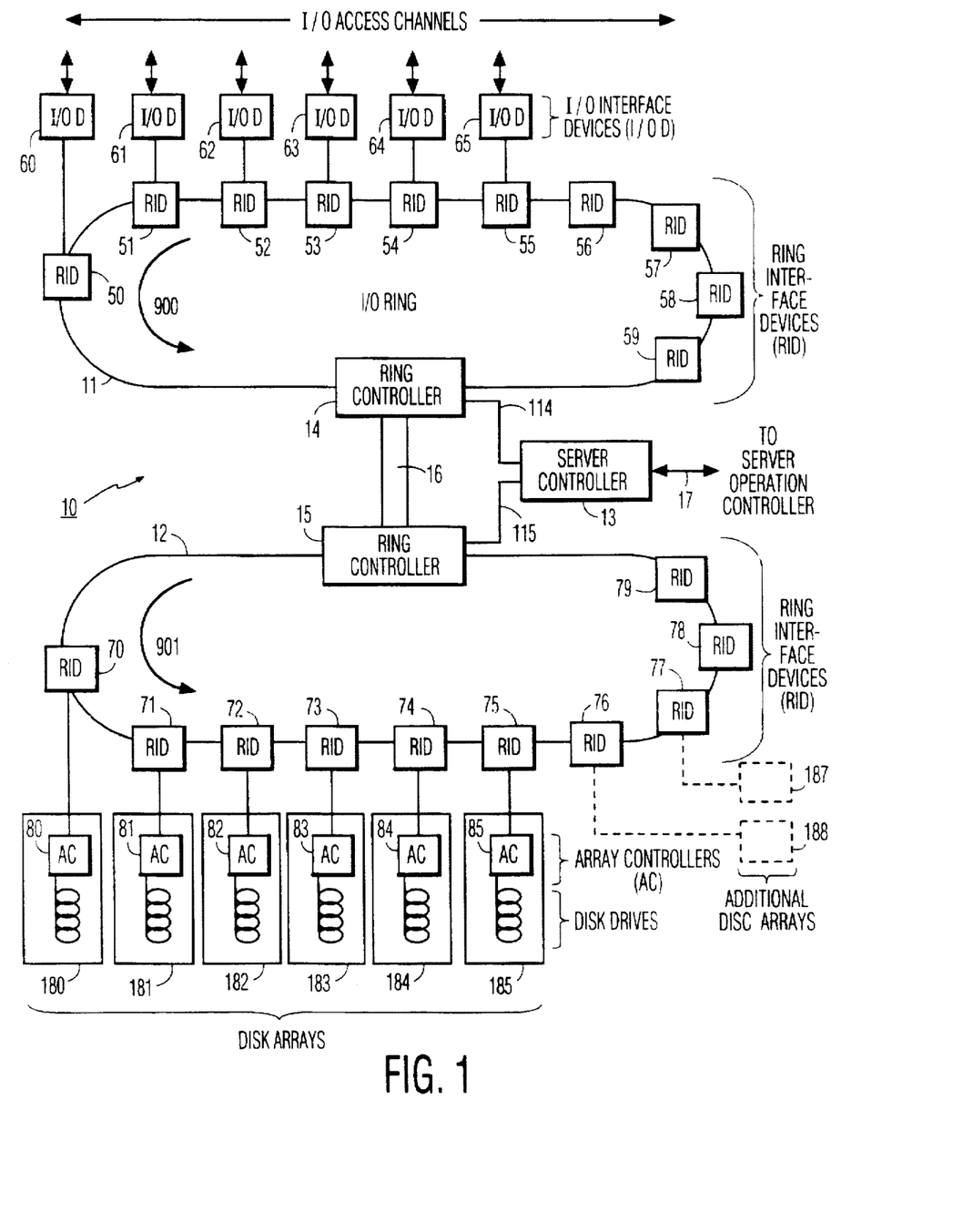
FIG. 1 shows a block diagram of an embodiment of an advanced data server in accordance with the invention.

FIG. 1 is a block diagram of an advanced data server, server 10, in accordance with the invention. Server 10 contains an I/O ring 11, a disc array ring 12 and a server controller 13. I/O ring 11 and disc array ring 12 can be any type of ring (e.g., a token ring, LAN, etc.) which will allow data to circulate around that ring, but preferably is fiber-optic. I/O ring 11 and disc array ring 12 are coupled to one another by means of a high speed coupling 16, such as a multichannel high speed fiber-optic communication line, and to server controller 13 via communication lines 114 and 115, respectively.

I/O ring 11 includes a ring controller 14 and a plurality of ring interface devices (RID) 50-59. In the example shown in FIG. 1, ring interface devices 50-55 are coupled to I/O interface devices (I/O D) 60-65. I/O interface devices 60-65 are in turn coupled to I/O access channels, respectively, which I/O access channels may be of the same or different type(s). For example, some or all of the I/O access channels could be ATM I/O access data channels, D1 I/O access data channels or some other type of I/O access data channel which can be coupled to appropriate data channels of the same type. Ring controller 14 directly couples I/O ring 11 to server controller 13 via communication line 114.

Disc array ring 12 includes a ring controller 15 and a plurality of ring interfaces devices (RID) 70-79. In the example shown in FIG. 1, ring interface devices 70-75 are coupled to disc arrays 180-185, respectively. Each of disc arrays 180-185 includes an array controller and a plurality of disc drives (e.g., optical, magneto-optical, phase change, magnetic, etc.) coupled thereto. In the example shown in FIG. 1, disc arrays 180-185 contain array controllers (AC) 80-85. Array controller 80 is coupled to ring interface device 70; Array controller 81 is coupled to ring interface device 71; etc. Ring controller 15 directly couples disc array ring 12 to server controller 13 via communication line 115.

FIG. 1 shows I/O ring 11 and disc array ring 12 each the having the same number of ring interface device included therein. This is only an example of an I/O ring and a disc array ring in accordance with the invention. Each ring could have more or less ring interface devices included therein. The number need not be the same.

In order to understand the manner in which server 10 operates, it is beneficial to discuss the manner in which data is received and stored by server 10, and then retrieved and read out therefrom. We begin first with a discussion of receipt of data and storage in server 10.

Server controller 13 operates as a high level general operation controller for server 10. When data is to be received by server 10 for storage therein, information about what data is to be received, where it is to be received and when it is to be received is communicated to server controller 13, via communication line 17, by a server operation controller (not shown). (The server operation controller can be either a user operated computer/microprocessor or a system computer operated computer/microprocessor.) If server 10 is to receive data pertaining to a particular program from one of the I/O access channels beginning at a particular time, for example, then server controller 13 receives information about the name of the program, from which ring interface device data pertaining thereto is to be received and when receipt is to begin.

Before being able to inform server controller 13 as to which one of the ring interface devices 50-59 is to receive data pertaining to a particular program, the server operation controller confirms that that ring interface device is coupled to an I/O access channel. The operations of I/O ring 11, in conjunction with server controller 13, makes this possible. More specifically, ring interface devices 50-59 provide information to ring controller 14, via I/O ring 11, as to which of those ring interface devices are coupled to I/O access channels, and as a result, server controller 13 can obtain confirmation information therefrom and provide it to the server operation controller.

Prior to data pertaining to a particular program being received by server 10, server controller 13 (a) provides ring controller 14 with an ID code which is to be associated with that program and the data pertaining thereto and (b) informs ring controller 14 which ring interface device will receive that data. Server controller 13 selects a different ID code for each program which the server operation controller indicates server 10 will receive, and stores ID information in a memory (not shown) therein specifying the ID codes associated with the programs which server 10 has received and are stored therein. In response to receiving information about which ring interface device will receive data pertaining to a particular program, ring controller 14 sends a read in command to that ring interface device so that the I/O interface device coupled thereto and that ring interface device will operate in a read in mode. Ring controller 14 will know which ring interface devices 50–59 are coupled I/O access channels by information supplied by those ring interface devices.

It is preferred that data which is received by the ring interface devices 50–55 is received in data packets. In accordance with this preference, in a preferred embodiment, the I/O access channels coupled to ring interface devices 50–55, via I/O interface devices 60–65, are ATM I/O access data channels which receive data in data packets. Nevertheless, server 10 can be designed so that data which is received by any of the I/O interface devices 60–65 which is not packetized, will be converted into packetized data by upon receipt by that I/O interface device. (In such circumstances, that device will also be designed to convert packetized data into the correct format of the I/O access channel coupled thereto when and if used in a read out mode.) Further, it should be noted that although the receipt of packetized data by the ring interface devices 50–55 is preferred, it is not necessary, and the invention can be used with unpacketized data.

If data packets pertaining to a particular program are received, sequentially, by ring interface device 50 (from the I/O access channel coupled thereto, via I/O interface device 60), for example, ring interface device 50 upon receipt of the first data packet pertaining to that program sends a receipt command to ring controller 14, via I/O ring 11. That receipt command indicates that receipt of the data packets pertaining to a particular program has begun. Upon receipt of each data packet pertaining to that program, ring interface device 50 attaches a receipt code thereto indicating that that data packet was received by ring interface device 50. Thereafter, ring interface device 50 places that data packet on I/O ring 11. The flow of data around I/O ring 11 is indicated by arrow 900.

As ring controller 14 receives, via I/O ring 11, each of the data packets pertaining to a particular program (as indicated by the receipt code and the other information which server 13 has received), it replaces the receipt code with the appropriate ID code selected by server controller 13 for the program to which that data packet pertains. In the preferred embodiment, ring controller 14 also attaches to each data packet of a particular program a sequence order number indicating where in the sequence of data packets pertaining to that program that data packet falls. Thereafter, ring controller 14 communicates with ring controller 15 to determine if both are ready for ring controller 14 to begin transferring those data packets to ring controller 15.

If ring controller 14 is ready to transfer, and ring controller 15 is ready to receive, the data packets pertaining to a particular program, ring controller 14 transfers those data packets, via coupling 16, to ring controller 15. However, if ring controller 14 is not ready to transfer, or ring controller 15 is not ready to receive, those data packets immediately, they will circulate around I/O ring 11, until ring controller 14 is ready to transfer, and ring controller 15 is ready to receive, those data packets. It is preferably that the data packets are transferred from ring controller 14 to ring controller 15 in the same order as they are received. Ring controller 14 can ensure that this occurs, in the preferred embodiment, on the basis of the sequence order numbers attached to the data packets. As each data packet is sent from ring controller 14 to ring controller 15, it is purged from I/O ring 11 by ring controller 14.

Prior to receiving the data packets pertaining to a particular program, server controller 13 provides ring controller 15 with a signal indicating that it will be receiving data packets with a particular ID code. As each data packet containing that ID code (i.e., a data packet pertaining to that program) is received by ring controller 15, ring controller 15 makes an assessment as to which ring interface devices 70–79 are coupled to disc arrays and which of those disc arrays are active and available for storing data therein. Information necessary for that assessment is provided to ring controller 15 by ring interface devices 70–79, via disc array ring 12. In operation, the assessment preferably involves ring controller 15 confirming that no changes in the number of disc arrays active and available for storing data therein and coupled to the ring interface devices has occurred.

On the basis of the assessment, ring controller 15 de-packetizes the data of a data packet and attaches an assignment code to each portion thereof (hereinafter each such portion being referred to as a "data portion") indicating to which one of the ring interface devices 70–79 that data portion is to be received by for storage within the disc array coupled thereto. In addition, ring controller 15 also attaches a reference order number (possibly including the ID code therewith) to each of the data portions so that it can reference those data portions.

The manner in which server 10, and in particular ring controller 15, operates so that data pertaining to a particular program is stored adheres to the principal, introduced by the Media Pool video server, of striping data across arrays to reduce disc latency. More specifically, ring controller 15 causes the data portions belonging to the data packets containing data pertaining to a particular program (i.e., data associated with the same ID code) to be striped across the active and available disc arrays. To achieve this, ring controller 15 preferably operates in a manner whereby it assigns each successive data portion belonging to each of the successive data packets containing data pertaining to a particular program (i.e., being associated with a particular ID code) to a different successive one of the ring interface devices having a disc array coupled thereto which is active and available for storing data therein.

Ring controller 15 contains a memory (not shown) for storing information indicating what (a) reference order number and (b) ring interface device each data portion pertaining to a particular program has been assigned. (Accordingly, ring controller 15 is capable of determining which reference numbers are associated with a particular ID code.) In addition, the memory included in ring controller 15 also, preferably, stores packet information indicating from which data packet, and in particular, the sequence order number, data portions pertaining to a particular program were originally included. (It is noted that the memory included in ring controller 15 need not store the sequence order numbers of the data packets pertaining to a particular program, if the reference order numbers of the successive data portions of successive data packets pertaining to a particular program are in a particular sequence.)

In accordance with FIG. 1, if it were assumed that all of disc arrays 180–185 shown therein are active and available for storing data therein and the data contained in each of the first two successive data packets are each divided into six successive data portions, i.e., the first data packet is divided into successive data portions A, B, C, D, E, F, and the second data packet is divided into successive data portions G, H, I, J, K, L, then ring controller 15 would, in accordance with the preferred embodiment, assign those data portions with a reference order number and for receipt by the ring interface devices as indicated in Table 1, hereinafter:

TABLE 1

Portion A, Reference Order No. 1 --> Ring Interface Device 70
Portion B, Reference Order No. 2 --> Ring Interface Device 71
Portion C, Reference Order No. 3 --> Ring Interface Device 72
Portion D, Reference Order No. 4 --> Ring Interface Device 73
Portion E, Reference Order No. 5 --> Ring Interface Device 74
Portion F, Reference Order No. 6 --> Ring Interface Device 75
Portion G, Reference Order No. 7 --> Ring Interface Device 70
Portion H, Reference Order No. 8 --> Ring Interface Device 71
Portion I, Reference Order No. 9 --> Ring Interface Device 72
Portion J, Reference Order No. 10 --> Ring Interface Device 73
Portion K, Reference Order No. 11 --> Ring Interface Device 74
Portion L, Reference Order No. 12 --> Ring Interface Device 75

In accordance with this example, ring controller 15 would, for example, attach an assignment code to each data portion (identified above) indicating which of the ring interface devices 70–75 should receive that data portion. For example, Portions A and G might be provided with an assignment code 70, Portions B and H might be provided with an assignment code 71, etc.

As the data portions receive their reference order numbers and assignment codes, ring controller 15 places them on disc array ring 12. The flow of data around disc array ring 12 is indicated by arrow 901. Thereafter, the appropriate ring interface devices 70–75 each detect which data portions, as they move along disc array ring 12, contain the assignment code associated therewith, and supply those data portions to the disc array coupled thereto for storage therein.

In further accordance with the previous example, when ring interface device 70 detects a data portion (e.g., Portion A) on disc array ring 12 which has the assignment code 70 attached thereto, it supplies that data portion to disc array 180. Likewise, when ring device interface 71 detects a data portion (e.g., Portion B) on disc array ring 12 which has the assignment code 71 attached thereto, it supplies that data portion to disc array 181. The other ring interface device 182–185 operate in the same manner.

When a ring interface device detects and receives a data portion, it communicates that it has received that data portion to ring controller 15 by sending a signal thereto referencing the reference order number associated with that data portion. Thereafter, ring controller 15 purges that data portion from disc array ring 12 the next time that data portion comes around the ring.

Data which is supplied to each of disc arrays 180–185 is stored in the disc drives included therein by being striping across the disc drives included therein. The process for achieving that striping (i.e., striping across the disc drives), in accordance with the invention, like the process of striping the data portions across the disc arrays, involves an assessment of active and available storage components followed by an assignment/striping of that data to/across those storage components on the basis of that assessment.

As each of the disc controllers 80–85 included in the disc arrays 180–185, respectively, receives a data portion, it makes an assessment as to how may disc drives are included in that disc array and which of those disc drives are active and available for storing data therein. Each of the array controllers 80–85 operates in a manner whereby it possesses sufficient information to make that assessment. As with ring controller 15, in operation, the assessment preferably involves an array controller confirming that no changes in the number of disc drives active and available for storing data therein and coupled thereto has occurred.

On the basis of the assessment, the array controller (e.g., array controller 80) strips the data of that data portion, i.e., the successive sub-portions thereof, across different ones of all of the disc drives included therein which are active and available for storing data. Each of the disc controllers 80–85 includes a memory therein, in which information indicating where, i.e., in which disc drive, each sub-portion of each data portion received is stored in conjunction with the reference order number associated therewith.

Once data pertaining to a particular program has been received and stored in server 10, that data is available to be retrieved and read out therefrom. What follows is a discussion of that operation, it being noted that the retrieval and read out operation works substantially the same as the receipt and storage operation, but in reverse.

When data pertaining to a particular program is to be retrieved and read out of server 10, server controller 13 receives information, via communication line 17, from the server operation controller (not shown), about the name of the program to be retrieved, where that data is to be supplied for read out (i.e., which one or more ring interface devices coupled to one or more I/O access channels) and when read out is to begin. Before informing ring controller 14 as to which one or more ring interface devices is to be supplied with data pertaining to a program, the server operation controller confirms that those ring interface devices are coupled to an I/O access channel. As stated above, ring interface devices 50–59 provide information to ring controller 14, via I/O ring 11, as to which of those ring interface devices are coupled to I/O access channels, and as a result, server controller 13 can obtain confirmation information therefrom and provide it to the server operation controller.

Once the information about what, where and when has been received by server controller 13, it determines, from its memory, the ID code corresponding to the particular program for which retrieval and read out has been requested (hereinafter referred to as a "selected program"). Thereafter, ring controller 15 and ring controller 14, in conjunction with server controller 13, determine when the data pertaining to the selected program needs to be retrieved from the disc arrays in which that data is stored, when that data must be supplied by ring controller 15 to ring controller 14 and when that data must be received by the one or more ring interface devices coupled to the one or more I/O access channels to which that data is to be read out so that read out begins at the correct time. That information is then used by server controller 13, in conjunction with ring controllers 14 and 15, to ensure that ring controllers 14 and 15 perform the appropriate functions at the correct time.

Retrieval of data pertaining to a selected program begins by ring controller 15 sending retrieval commands to disc array ring 12 for receipt by the disc arrays which store that data therein. Those retrieval commands specify which of disc arrays 180–185 are to retrieve what data portions stored therein so that those data portions can be provided to disc array ring 12.

Ring controller 15 determines what retrieval commands to send on the basis of (a) the reference order numbers, and the associated packet information (if available), associated with the ID code associated with the selected program and (b) the assignment codes associated therewith stored in its memory. A typical retrieval command will indicate what data portion, via reference order number, is to be retrieved and from which disc array, via assignment code.

When a ring interface device (e.g., ring interface device 70) receives a retrieval command (e.g., a command having the assignment code 70) intended for receipt by the disc array (e.g., disc array 180) coupled thereto, that ring interface device transfers that retrieval command to that disc array. The array controller (e.g., array controller 80) included in that disc array then causes the data portion (e.g., Portion A, indicated by Reference Order No. 1, discussed above) which that retrieval command requests retrieval of to be retrieved and supplied to the ring interface device (e.g., ring interface device 70) coupled thereto. Thereafter that ring interface device places that data portion on disc array ring 12.

In order to obtain and retrieve a requested data portion, an array controller (e.g., array controller 80) searches its memory to determine which data sub-portions, in which order, are part of that data portion and in which disc drives they are stored. Thereafter, on the basis of that information, that array controller retrieves those sub-portions in the correct sequence, attaches the reference order number associate with the data portion to which those sub-portions belong thereto and supplies those sub-portions as a data portion to the ring interface device coupled thereto (e.g., ring interface device 70).

The process just described is performed by ring controller 15, ring interface devices 70–75 and disc arrays 180–185 so that the data portions pertaining to a selected program are retrieved from disc arrays 180–185 (and the disc drives included therein) in which those data portions are stored and provided to disc array ring 12. Preferably, ring controller 15 produces the retrieval commands in a manner whereby the data portions pertaining to a selected program are retrieved from disc arrays 180–185 in their proper original sequence.

As the data portions pertaining a selected program begin to appear on disc array ring 12, ring controller 15 re-packetizes those data portions and attaches to each data packet the ID code associated with the program to which those data portions pertain. Those data portions may be re-packetized in their original form (i.e., into the same data packets in which those data portions were originally contained when received by server 10) or in a new form.

Regardless of whether the data portions pertaining to a selected program are re-packetized in their original form or in a new form, it is important that the data portions pertaining to that program be re-packetized in the proper sequence. The memory included in ring controller 15 contains sufficient information, i.e., the reference order numbers and, possibly, the sequence order numbers, to make this possible. That being the case, it is noted that even if the data portions pertaining to a selected program are not retrieved from disc arrays 180–185 in the proper order, disc array ring 12 enables ring controller 15 to re-packetize those data portions in their proper order by allowing one or more subsequent data portions to circulate around disc array ring 12 until the preceding data portion has been received by ring controller 15.

In the preferred embodiment, the data portions pertaining to a selected program are re-packetized in accordance with their original form. In addition to those data packets including the ID code associated with the program to which they pertain, ring controller 15 also includes, in the preferred embodiment, the original sequence order number associated with each data packet therein.

As the data portions are re-packetized into data packets by ring controller 15, it purges those data portions (including the reference order numbers included therein) from disc array ring 12. If ring controller 15 is ready to transfer, and ring controller 14 is ready to receive, the re-packetized data packets pertaining to a selected program, then ring controller 15 transfers those data packet to ring controller 14. Otherwise, those data packets are placed on disc array ring 12 and allowed to circulate until ring controller 14 is ready to transfer, and ring controller 14 is ready to receive, those data packets.

It is preferable that ring controller 15 supply the data packets pertaining to a selected program to ring controller 14 in the proper sequence order. In the preferred embodiment, ring controller 15 can use the sequence order numbers included in the re-packetized data packets to ensure that this occurs. Nevertheless, since the re-packetized data packets, in the preferred embodiment, contain sequence order numbers, it is not necessary that the data packets pertaining to a selected program be transferred in the proper sequence order.

Prior to the data packets pertaining to a selected program being received by ring controller 14 from ring controller 15, server controller 13 informs ring controller 14 (a) that it will be receiving data packets having a particular ID code which is associated with that program therein from ring controller 15 and (b) which one or more of the ring interface devices 50–55 that program is to be supplied for read out to the one or more I/O access channels coupled thereto. In response to receiving information about which one or more ring interface devices are to be supplied with a selected program, ring controller 14 sends a read out command to those one or more ring interface devices to cause them and the one or more the I/O interface devices coupled thereto to operate in a read out mode.

Upon receiving each of the data packets pertaining to a selected program from ring controller 15, ring controller 14 (a) replaces the ID code attached thereto with one or more location codes specifying which one or more of the interface device 50–55 the data packets of that program are to be supplied to for transfer and read out to the one or more I/O access channels coupled thereto, and then (b) places that data packet on I/O ring 11. For example, if the data packets of a selected program are to be supplied to ring interface devices 50 and 51, then ring controller 14 might replace the ID code attached to each with location codes 50 and 51. Thereafter, as those data packets are received by ring interface devices 50 and 51, they each recognize their respective location code (i.e., ring interface device 50 recognizes location code 50, and ring interface device 51 recognizes location code 51) and transfer those data packets to the I/O access channel coupled thereto (via I/O interface devices 60 and 61, respectively). Before a data packet which has been received by an appropriate ring interface device is transferred to the I/O access channel coupled thereto for read out, that ring interface device deletes the sequence order number attached thereto.

When a ring interface device detects and receives a data packet which it is supposed to receive, it communicates that it has received that data packet to ring controller 14 by sending a signal thereto referencing the sequence order number associated with that data packet. Thereafter, if all of the interface devices which are supposed to receive that data packet have indicated that they have received that data packet, then ring controller 14 purges that data packet from I/O ring 11 the next time that data packet comes around the ring.

Because data packets pertaining to a selected program in the preferred embodiment have sequence order numbers attached thereto, ring controller 14 can determine whether those data packets are being received in the proper sequence order, and if not, it can still ensure that those data packets are supplied to the appropriate one or more ring interface devices in the proper sequence order. When the data packets pertaining to a selected program are not received in the proper sequence order, ring controller 14 can be designed to operate in a manner whereby it delays the replacement of the ID code attached to a data packet received whose preceding data packet has not yet been received, and allow that subsequent data packet to circulate around I/O ring 11 until the preceding data packet has been received and has had the ID code attached thereto replaced by the appropriate location code. Alternatively, each of the ring interface devices 50–55 can be designed so that it selects the data packets pertaining to a selected program which it is supposed to receive, as those data packets circulate around I/O ring 11, in the proper sequence order (on the basis of the sequence order numbers attached to those data packets).

The discussion above has focussed primarily on the receipt and storage, and retrieval and read out of a single program. Nevertheless, server 10 is designed to handle simultaneous receipt and storage, and retrieval and read out of several programs at a time, with each performed in the manner discussed above. For example, while ring interface device 50 is receiving one program, ring interface devices 51 and 52 can be receiving two other programs, respectively, and ring interface devices 53–55 can be supplying three other programs, respectively, to the I/O access channels coupled thereto. Under the control of server controller 13, ring controller 14 and ring controller 15 operate to coordinate this simultaneous receipt and storage, and retrieval and read out of several programs.

The manner in which server 10 operates makes it easily expandable to include additional disc arrays and disc drives. More specifically, (a) the manner in which ring controller 15 operates in assigning which of ring interface devices 70–79 will receive which data portions of a data packet and keeps track of that information makes this possible with respect to additional disc arrays; and (b) the manner in which array controllers 80–85 operate in assigning which disc drives therein will receive which sub-portions of a data portion and keep track of that information make this possible with respect to additional disc drives.

As discussed above, each time ring controller 15 receives a data packet, it (a) makes an assessment as to which of ring interface devices 70–79 are coupled to active and available disc arrays for storing data, and (b) on that basis, (i) assigns each of the data portions thereof to different ones of those ring interface devices (so that the those data portions will be striped across those disc arrays coupled thereto) and (ii) stores information indicating which data portions of that data packet are stored in which disc arrays. By operating in this fashion, additional disc arrays, via available ring interface devices (i.e., ring interface devices 76–79), can be added to server 10 without affecting the operations of server 10 during or after such expansion.

For example, assume that at time $t_1$, data packet X is received by ring controller 15. Further, assume that upon receipt of that data packet, ring controller 15 determines from its assessment as to which of ring interface devices 70–79 are coupled to active and available disc arrays that only ring interface devices 70–75 are coupled to active and available disc arrays. As a result, ring controller 15 might divide that data packet up into the following six data portions: X1, X2, X3, X4, X5 and X6, and assign those data portions to ring interface devices 70–75 for storage on the disc arrays coupled thereto as indicated in Table 2 hereinafter:

TABLE 2

X1 --> Ring Interface Device 70 for storage on Disc Array 180
X2 --> Ring Interface Device 71 for storage on Disc Array 181
X3 --> Ring Interface Device 72 for storage on Disc Array 182
X4 --> Ring Interface Device 73 for storage on Disc Array 183
X5 --> Ring Interface Device 74 for storage on Disc Array 184
X6 --> Ring Interface Device 75 for storage on Disc Array 185.

Thereafter, ring controller 15 stores that information in its memory.

Now assume that subsequent to the assessment made by ring controller 15 with respect to data packet X two additional disc arrays, i.e., new disc arrays 187 and 188, are added to server 10 by coupling them to ring interface devices 76 and 77, respectively. (It is noted that since the additional disc arrays 187 and 188 are added subsequent to the assessment made with respect to data packet X, they do not have any impact on the storage process of data packet X.) Thereafter, at time $t_2$, assume that a new data packet Y is received by ring controller 15. This time, when ring controller 15 makes an assessment as to which of ring interface devices 70–79 are coupled to active and available disc arrays, it determines that the answer now is ring interface devices 70–77. As a result, in accordance with the invention, ring controller 15 might divide that data packet up into the following eight data portions: Y1, Y2, Y3, Y4, Y5, Y6, Y7 and Y8, and assign those data portions to ring interface devices 70–77 for storage on the disc arrays coupled thereto as indicated in Table 3 hereinafter:

TABLE 3

Y1 --> Ring Interface Device 70 for storage on Disc Array 180
Y2 --> Ring Interface Device 71 for storage on Disc Array 181
Y3 --> Ring Interface Device 72 for storage on Disc Array 182
Y4 --> Ring Interface Device 73 for storage on Disc Array 183
Y5 --> Ring Interface Device 74 for storage on Disc Array 184
Y6 --> Ring Interface Device 75 for storage on Disc Array 185
Y7 --> Ring Interface Device 76 for storage on Disc Array 186
Y8 --> Ring Interface Device 77 for storage on Disc Array 187.

Thereafter, ring controller 15 stores that information in its memory.

From the previous example, it should be clear that the addition of additional disc arrays does not affect the receipt and storage process, i.e., the process which is used in storing data packets X and Y remains the same, even though two addition disc arrays have been added. The same is also true of the retrieval and read out process.

In accordance with the previous example, when retrieval of data packet X is requested, ring controller 15 determines from its memory that the data portions thereof are stored on disc arrays 180–185 and sends the proper retrieval commands to ring interface devices 70–75, via disc array ring 12, to makes sure that the data portions thereof are retrieved and supplied to ring controller 15, via disc array ring 12, for re-packetization. When retrieval of data packet Y is requested, the same general procedure is followed, except that this time ring controller 15 sends retrieval commands to ring interface devices 70–77 to retrieve the signal portions stored on disc arrays 180–186 coupled thereto.

The procedure for storing and retrieving a data portion on the disc drives within a disc array operates in substantially the same fashion. Upon receipt of a data portion, an array controller makes an assessment of how may active and available disc drives are included in that disc array, and on that basis, determines which sub-portions are to be stored on which disc drives so that the sub-portions of that data portion are striped across the active and available disc drives. Thereafter, information indicating which sub-portions of the data portion are stored on which disc drives is stored in the memory included in that array controller. That array controller can, and does, use that information to retrieve the data portion. If more disc drives are added, the procedure for storage and retrieval remains exactly the same, except for the number of disc drives being involved.

It should be clear from the previous discussion that the manner in which server 10 operates, i.e., being able to take into account changes in the active and available disc arrays and disc drives, enables it to operate in a continuous, uninterrupted, fashion during and after additional data components are added, removed or become unavailable to store additional data therein. As a result, unlike the Media Pool video server, data which has been previously stored in disc arrays and disc drives included therein does not need to be re-striped subsequent to the addition of one or more disc arrays and/or disc drives.

As the previous paragraph suggests, certain storage components of server 10 over time could become unavailable to store additional data therein. One reason for that is that over time the disc arrays and disc drives therein may fill up with too much stored data. In order to keep on top of this, server controller 13 is kept appraised of how much storage capacity exists at a give instance via information from array controllers 80–85 and ring controller 15. Based on that information, server controller 13 will inform the server operation controller whether it needs additional disc arrays and/or disc drives added, and/or whether server 10 is no longer in a position to storage data therein.

Because the manner in which I/O ring 11 operates is substantially independent of the manner in which disc array ring 12 operates, server 10 is also easily expandable to include additional I/O access channels (without affecting the operations of server 10 during or after such expansion). (Additional I/O access channels are added via means of adding I/O interface devices to available ring interface devices 56–59.) More specifically, the ring configuration of I/O ring 11 is such that it enables I/O ring 11 to add additional I/O access channels and to continue to operate in the same fashion with respect to receipt of data for storage and read out of data which has been stored, except that additional I/O access channels are available for receiving and/or read out such data. Furthermore, it is noted that I/O ring 11 and ring controller 14 thereof have sufficient capacity and capability to handle the additional data flow resulting from additional I/O access channels so that the bandwidth of server 10 is not affected.

Figure 2:
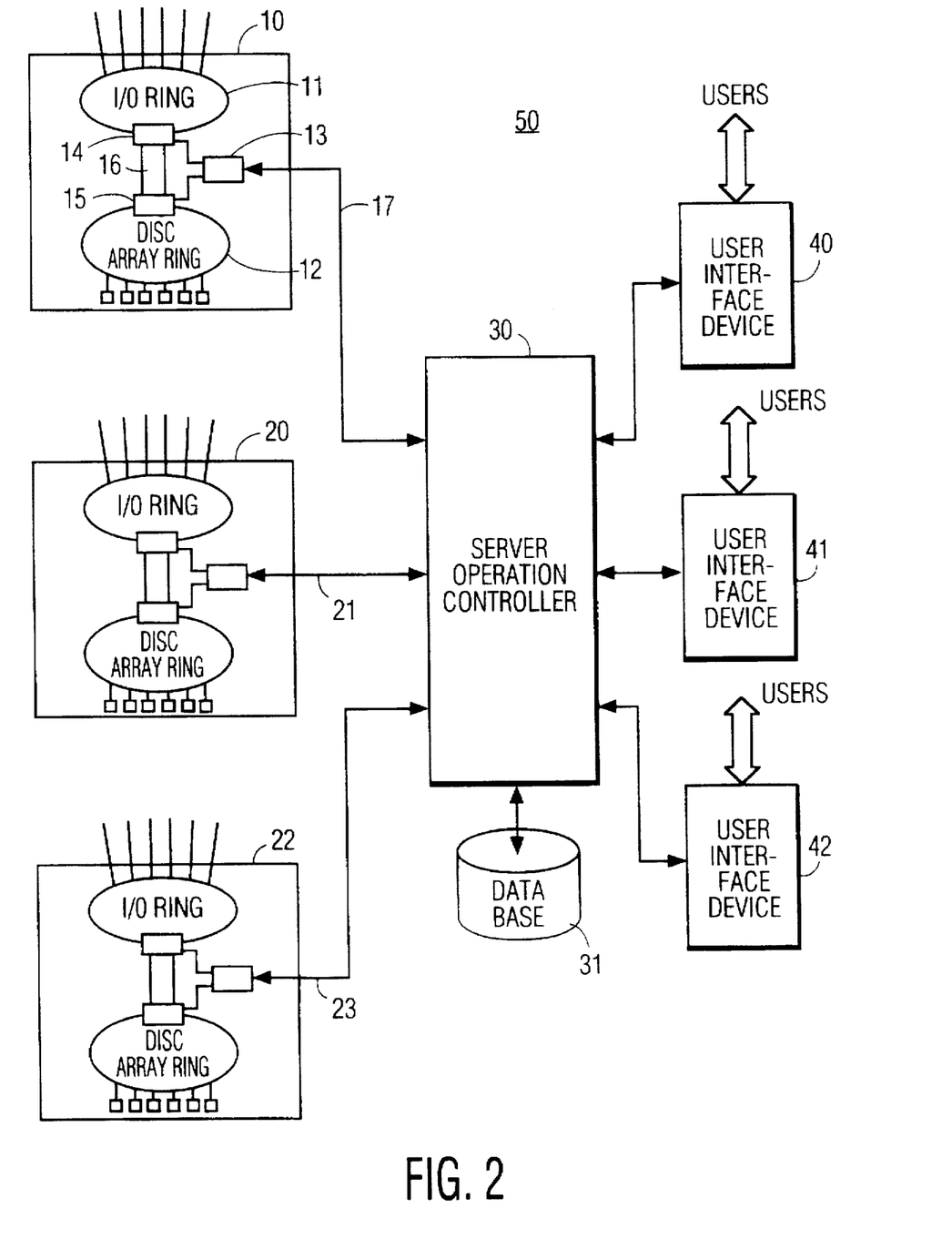
FIG. 2 shows a block diagram of a server system in accordance with the invention, including the server shown in FIG. 1.

FIG. 2 is a block diagram of a server system, server system 50, in accordance with the invention. Server system 50 includes servers 10 (of FIG. 1), 20 and 22. Servers 20 and 22 are essentially identical to server 10, and operate in the same fashion. Server system 50 also includes a server operation controller 30 (which could be the server operation controller discussed above) and a plurality of user interface devices 40, 41 and 42. Server operation controller 30 is coupled to servers 10, 20 and 22 via communication lines 17, 21 and 23, respectively. Server operation controller 30 is also coupled to user interface devices 40, 41 and 42.

Server system 50 operates in a manner whereby it enables users at numerous different locations (e.g., at different locations on the Internet) to request and receive different programs stored on different ones of servers 10, 20 and 22. Server system 50 also enables different users at different locations to store different programs on servers 10, 20 and 22. (However, it is noted that if system 50 is used as a Web Site on the Internet, for example, it is preferable that only one user have the ability to store programs on servers 10, 20 and 22, and that all other users only be able to read out programs stored therein.)

As indicated in the previous paragraph, server system 50 stores numerous different programs on servers 10, 20 and 22. Server operation controller 30 contains or is coupled to (as indicated in FIG. 2) a data base 31 which indicates which programs are stored on which servers.

If a user connected to a user interface device (e.g., user interface device 40) requests that a particular program be received (such program hereinafter being referred to as a "requested program"), that request is provided by that user interface device to operation server controller 30, which, thereafter, determines on which of servers 10, 20 and 22 the selected program is stored. (If that program is not stored on any of servers 10, 20 and 22, server operation controller 30 will provide that information, via the appropriate user interface device, to the user requesting that program.) If the requested program is stored in server 10, for example, server operation controller 30 then determines to which I/O access channel coupled to server 10 the selected program must be provided to enable the user requesting that program to receive that program. In addition, server operation controller 30 determines when the selected program is to be sent. Based on that information, server operation controller 30 provides the appropriate information, as discussed above, to server 10 so that the requested program is supplied to the appropriate I/O access channel at the correct time.

The storage of a program on server system 50 works in a similar fashion. A user connected to a user interface device (e.g., user interface device 42) provides, via that user interface device, a command to server operation controller 30 indicating that he or she wants to store a program in server system 50 (which program is hereinafter referred to as the "storage program"). Upon receiving that command, which will include information about the size of the storage program, server operation controller 30 determines which of servers 10, 20 and 22, with the aid of the server controllers thereof, is available and has the necessary capacity to store that program. (If none of the servers 10, 20 and 22 has sufficient capacity to store that program, server operation controller 30 will provide that information, via the appropriate user interface device, to the user who desires to store the storage program. This in turn indicates that additional disc arrays, disc drives and/or servers should be added to server system 50.) If server operation controller 30 determines that server 10, for example, is the appropriate server to store the storage program, it then determines to which I/O access channel coupled to server 10 that program will be provided to for storage therein. In addition, server operation controller 30 determines when the storage program will be received. Based on that information, operation server controller 30 provides the appropriate information, as discussed above, to server 10 so that the storage program is stored therein. Thereafter, server operation controller 30 stores information in data base 31 indicating that the storage program has been stored on server 10.

Server system 50 is easily expandable. More specifically, the manner in which server operation controller 30 operates enables additional servers, like servers 10, 20 and 22, to be added to server system 50, via coupling those additional servers to server operation controller 30, without affecting the operations of server system 50 during or after such expansion.

Figure 3:
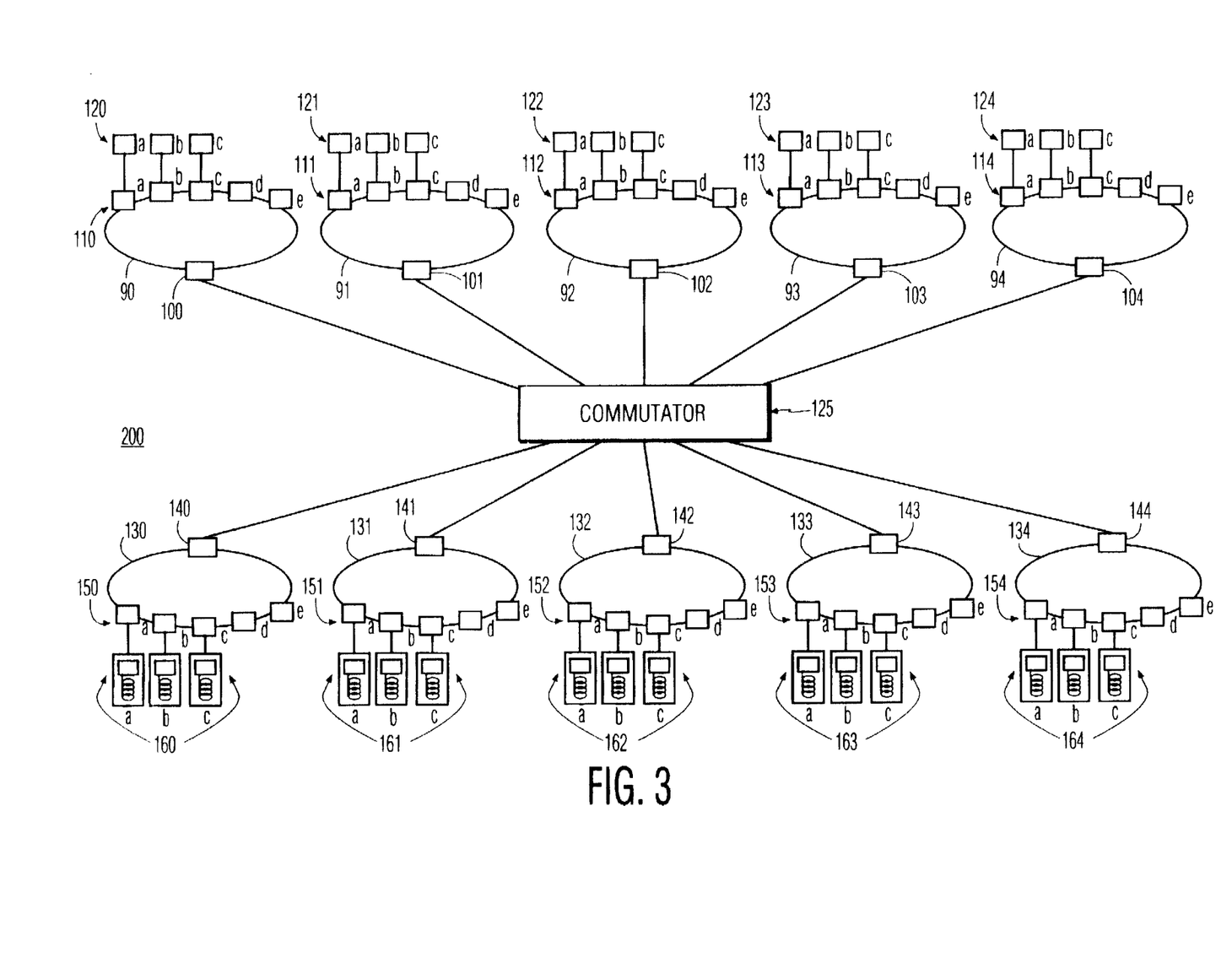
FIG. 3 shows a block diagram of another embodiment of an advanced data server in accordance with the invention.

FIG. 3 shows a block diagram of another advanced data server, server 200, in accordance with the invention. Server 200 includes a plurality of I/O rings 90–94 and a plurality of disc array rings 130–134 coupled to one another by means of a commutator 125.

I/O rings 90–94 are each substantially the same as I/O ring 11 shown in FIG. 1, and operate in substantially the same way as described above with respect to FIG. 1. I/O rings 90–94 each include a ring controller, i.e., ring controllers 100–104, respectively, and a plurality of ring interface devices, i.e., ring interface devices 110a–e through 114a–e, respectively. Further, certain of the pluralities of ring interface devices 110a–e through 114a–e are coupled to corresponding pluralities of I/O interface devices, i.e., ring interface devices 110a–c are coupled to I/O interface devices 120a–c, respectively, ring interface devices 111a–c are coupled to I/O interface devices 121a–c, respectively, etc. Ring controllers 100–104 are coupled to commutator 125.

Disc array rings 130–134 are each substantially the same as disc array ring 12 shown in FIG. 1, and operate in substantially the same way as described above with respect to FIG. 1. Disc array rings 130–134 each include a ring controller, i.e., ring controllers 140–144, respectively, and a plurality of ring interface devices, i.e., ring interface devices 150a–e through 154a–e, respectively. Further, certain of the pluralities of ring interface devices 150a–e through 154a–e are coupled to corresponding pluralities of disc arrays, i.e., ring interface devices 150a–c are coupled to disc arrays 160a–c, respectively, ring interface devices 151a–c are coupled to disc arrays 161a–c, respectively, etc. Ring controllers 140–144 are coupled to commutator 125.

FIG. 3 shows each of I/O rings 120-124 and the disc array rings 130-134 as each the having the same number of ring interface devices included therein, and having the same number I/O interface devices and disc arrays coupled thereto, respectively. FIG. 3 shows an example of a server in accordance with the invention. Each I/O ring and disc array ring could have more or less ring interface devices, and I/O interface devices and/or disc arrays coupled thereto. The number of each need not be the same.

The configuration of server 200 is such that it enables the above-described expansion problems of the Media Pool video server to be solved without having to depart from use of a commutator, a key aspect of the Media Pool video server. This is achieved by employing I/O rings and disc array rings of the type described above in conjunction with a commutator, i.e., commutator 125. In accordance with the discussion provided above with respect to FIG. 1, server 200 can be expanded, without affecting the operations thereof during or after such expansion, by adding disc arrays to ring interface devices 150d–154d and 150e–154e and/or disc drives to disc arrays 160a–c through 164a–c, and/or providing access to additional I/O access channel by coupling the same via I/O interface devices to ring interface devices 110d–114d and 110e–114e.

Commutator 125 operates in substantially the same manner as a commutator included in the current Media Pool video server operates (see U.S. patent application Ser. Nos. 08/125,996, 08/389,672 and 08/530,041), except that now it receives data from I/O rings 90–94, in accordance with the invention, and strips that data across disc arrays rings 130–134, in accordance with the invention, for storage in disc arrays coupled thereto, and retrieves that data from those disc array rings and supplies it to those I/O rings in the opposite manner. With the striping of data across disc array rings, the importance of striping data across disc arrays becomes much less important, and it may be preferable that the data portions of data packets pertaining to a particular program delivered to a disc array ring all be stored within the same disc array, for this will reduce the amount of information which will need to stored in the ring controller of that ring. Nevertheless, it is still preferable to strip the subportions of a data portion supplied to a disc array across the active and available disc drives therein, for this, in combination with the striping across disc array rings, results in hierarchial/double striping, and therefore, reduces disc latency and maintains high bandwidth.

Another server system in accordance with the invention could include a plurality of servers of the type shown in FIG. 3. Such a system could look like the server system show in FIG. 2, with servers 10, 20 and 22 being replaced by or supplemented with servers of the type shown in FIG. 3.

That which is claimed is:

1. An advanced data server, comprising:
    an I/O ring coupled to at least one I/O access channel which provides data to the I/O ring or reads data out from the I/O ring;
    a disc array ring coupled to least two disc arrays which store therein data received from the disc array ring or retrieve therefrom data for receipt by the disc array ring, the disc array ring also being coupled to the I/O ring so that data can flow between those rings; and
    a server controller coupled to the I/O ring and the disc array ring, which server controller controls the I/O ring and the disc array ring to cause them to receive and store data or retrieve and read out data.

2. The server as claimed in claim 1, wherein the I/O ring includes a first ring controller which controls (a) receipt of data from the at least one I/O access channel and transfer of that data to the disc array ring, or (b) receipt of data from the disc array ring and transfer of that data to the at least one I/O access channel; and the disc array ring includes a second ring controller which controls (a) receipt of data from the I/O ring and storage of that data among the at least two disc arrays, or (b) retrieval of data from the at least two disc arrays and transfer of that data to the I/O ring.

3. The server as claimed in claim 2, wherein the first and second ring controllers are coupled to the server controller, and the server controller controls the I/O ring, via the first ring controller, and the disc array ring, via the second ring controller, to cause them to receive and store data or retrieve and read out data.

4. The server as claimed in claim 2, wherein the first ring controller is coupled to the second ring controller such that the first ring controller supplies data from or to the I/O ring to or from the disc array ring, respectively, via the second ring controller, and the second ring controller supplies data from or to the disc array ring to or from the I/O ring, respectively, via the first ring controller.

5. The server as claimed in claim 2, wherein the second ring controller operates in a manner whereby it causes data which is received by the disc array ring to be striped across the at least two disc arrays so that different data portions are received by and stored in different ones of those disc arrays.

6. The server as claimed in claim 5, wherein the second ring controller stores information indicating which data portions are stored in which of the at least two disc arrays.

7. The server as claimed in claim 5, wherein at least one of the at least two disc arrays includes an array controller and at least two disc drives, and the array controller operates in a manner whereby it causes data portions received by the disc array in which it is included to be striped across the at least two disc drives so that different data sub-portions of the data portions are stored in different ones of those disc drives.

8. The server as claimed in claim 7, wherein the array controllers stores information indicating which data sub-portions are stored in which of the at least two disc drives.

9. The server as claimed in claim 2, wherein the second ring controller (a) operates in a manner whereby when the disc array ring receives a packet of data, it makes an assessment as to how many disc arrays are coupled to the disc array ring and which of those disc arrays are active and available, there being at least two disc arrays which are active and available at any given time, and on that basis, strips that data across the active and available disc arrays so that different data portions of that packet of data are received by and stored in different one of those disc arrays, and (b) stores information indicating which data portions are stored in which disc arrays.

10. The server as claimed in claim 9, wherein at least one of the active and available disc drives includes an array controller and at least two disc drives, and the array controller (a) operates in a manner whereby when it receives a data portion, it makes an assessment as to how many disc drives are included in that active and available disc array and which of those disc drives are active and available, there being at least two active and available disc drives at any given time, and on that basis, causes that data portion to be striped across the active and available disc drives so that different data sub-portions of that data portions are stored in different ones of those disc drives, and (b) stores information indicating which data sub-portions are stored in which disc drives.

11. The server as claimed in claim 1, wherein the I/O ring includes a first ring controller coupled to the server controller, and an I/O ring interface device coupled to the at least one I/O access channel; and the disc array ring includes a second ring controller coupled to the server controller and the first ring controller, and at least two disc array ring interface devices coupled respectively to the at least two disc arrays.

12. The server as claimed in claim 11, wherein during a read in mode, the server controller operates to cause the I/O ring interface device to control receipt of data from the at least one I/O access channel and transfer of that data to the I/O ring, the first ring controller to control receipt of data from the I/O ring and transfer of that data to the second ring controller, the second ring controller to control receipt of data from the first ring controller and transfer of that data, via the disc array ring, to the at least two disc array ring interface devices, and the at least two disc array ring interface devices to each control receipt of data thereto and transfer of that data to the disc array coupled thereto for storage therein.

13. The server as claimed in claim 12, wherein during the read in mode, on the basis of information received by the server controller, the first ring controller causes the I/O ring interface device to control receipt of data from the at least one I/O access channel and transfer of that data to the I/O ring, and the second ring controller causes the at least two disc array ring interface devices to each control receipt of data thereto and transfer of that data to the disc array coupled thereto for storage therein.

14. The server as claimed in claim 11, wherein during a read out mode, the server controller operates to cause the at least two disc array ring interface devices each to control receipt of data from the disc array coupled thereto and transfer of that data to the disc array ring, the second ring controller to control (a) the at least two disc arrays so as to cause data stored therein to be provided via the at least two disc array ring interface devices to the disc array ring and (b) receipt of data from the disc array ring and transfer of that data to the first ring controller, the first ring controller to control receipt of data from the second ring controller and transfer of that data, via the I/O ring, to the I/O ring interface device, and the I/O ring interface device to control receipt of data thereto and transfer of that data to the at least one I/O access channel.

15. The server as claimed in claim 14, wherein during the read out mode, on the basis of information received by the server controller, the first ring controller causes the I/O ring interface device to control receipt of data thereto and transfer of that data to the at least one I/O access channel, and the second ring controller causes the at least two disc array ring interface devices each to control receipt of data from the disc array coupled thereto and transfer of that data to the disc array ring.

16. The server as claimed in claim 1, wherein the disc array ring is coupled to at least three disc arrays which each stores different data portions pertaining to a program and in which at least two of those disc arrays stores a different number of data portions therein, and the disc array ring includes a ring controller which stores information indicating which data portions pertaining to the program are stored in which of the at least three disc arrays.

17. The server as claimed in claim 16, wherein the ring controller is adapted to use the information stored therein to cause the at least three disc arrays to retrieve the data portions pertaining to the program stored therein and supply those data portions to the disc array ring.

18. The server as claimed in claim 1, wherein the disc array ring includes a ring controller which causes data received by the disc array ring to be striped across the at least two disc arrays so that different data portions are supplied to different ones of those disc arrays, and at least one of those disc arrays includes an array controller and at least two disc drives, which array controller (a) causes the data portions supplied to the disc array in which it is included to be striped across the at least two disc drives so that different data sub-portions are stored in different ones of those disc drives, and (b) stores information indicating which data sub-portions are stored in which of those disc drives; and wherein when an additional disc drive is added to the disc array having the at least two disc drives, the disc array controller included in that disc array causes (a) the data portions supplied to that disc array to be striped across the at least two disc drives and the additional disc drive so that different data sub-portions are stored in different ones of those disc drives, and (b) information indicating which data sub-portions are stored in which of those disc drives to be stored therein.

19. The server as claimed in claim 1, wherein the at least two disc arrays each store different data portion pertaining to a program, and at least one of those disc arrays includes an array controller and at least three disc drives which each stores different data sub-portions of the data portions stored in that disc array and in which at least two of those disc drives stores a different number of the data sub-portions, which array controller stores information indicating which of the data sub-portions are stored on which of the at least three disc drives.

20. The server as claimed in claim 19, wherein the array controller is adapted to use the information stored therein to cause the at least three disc drives to retrieve the data sub-portions stored therein and supply those data sub-portions as data portions to the disc array ring.

21. The server as claimed in claim 20, wherein the disc array ring includes a ring controller which stores information indicating which data portions pertaining to the program are stored in which of the at least two disc arrays, and the ring controller is adapted to use the information stored therein to cause the array controller to retrieve the sub-portions of the data portions which the information stored in the array controller indicates are stored in the at least one disc array including the array controller and the at least three disc drives.

22. The server as claimed in claim 1, wherein the I/O ring and the disc array ring are fiber-optic rings.

23. The server as claimed in claim 1, wherein the I/O ring and the disc array ring are coupled to one another via a multichannel high speed fiber-optic communication line.

24. A server system, comprising:
the server claimed in claim 1; and
a server operation controller coupled to the server controller, which server operation causes the server to receive and store data or retrieve and read out data on the basis of a user request indicating whether a user wishes to receive and store data or retrieve and read out data.

25. The system as claimed in claim 24, further comprising at least one user interface device coupled to the server operation controller, which user interface device generates the user request.

26. A server system, comprising:
at least two servers of the type claimed in claim 1, each of which stores or is used to store one or more different programs;
a server operation controller coupled to the server controller of each of the at least two servers, which server operation causes either or both of the at least two servers to receive and store a program or retrieve and read out a program on the basis of a user request indicating whether a user wishes to receive and store a program or retrieve and read out a program; and
at least one user interface device coupled to the server operation controller, which user interface device generates the user request.

27. The system as claimed in claim 26, wherein the user request identifies a specific program which is to be received and stored or retrieved and read out, and the server operation controller operates in a manner whereby it determines on which of the at least two servers that program is stored or is to be stored and causes that program to be received and stored on or retrieved and read out from that server.

28. The system as claimed in claim 25, wherein the system is easily expandable to included additional disc drives, disc arrays, servers and/or user interface devices.

29. An advanced data server, comprising:
an I/O ring coupled to at least one I/O access channel which provides data to the I/O ring or reads data out from the I/O ring; and
a disc array ring coupled to least two disc arrays which store therein data received from the disc array ring or retrieve therefrom data for receipt by the disc array ring, the disc array ring being coupled to the I/O ring so that data can flow between those rings;
wherein the I/O ring includes a first ring controller which controls (a) receipt of data from the at least one I/O access channel and transfer of that data to the disc array ring, or (b) receipt of data from the disc array ring and transfer of that data to the at least one I/O access channel; and the disc array ring includes a second ring controller which controls (a) receipt of data from the I/O ring and storage of that data among the at least two disc arrays, or (b) retrieval of data from the at least two disc arrays and transfer of that data to the I/O ring.

30. The server as claimed in claim 29, wherein different data portions of the data are stored in different ones of the at least two disc arrays, and the second ring controller stores information indicating which data portions of the data are stored in which of the at least two disc arrays.

31. The server as claimed in claim 30, wherein at least one of the at least two disc arrays includes at least two disc drives in which different sub-portions of the data portions which are stored in that at least one disc array are stored, and that at least one disc array further stores information indicating which data sub-portions are stored in which of the at least two disc drives.

32. A data server, comprising
an I/O ring coupled to at least one I/O access channel including means for receiving data into the I/O ring and transmitting data from the I/O ring;
a disk array ring coupled to at least two disk arrays including means for storing data from the disk array ring and retrieving data to the disk array ring;
a server controller coupled to the I/O ring and disk array ring, including means for controlling the I/O and disk array rings to receive and store data or retrieve and transmit data; and
means for coupling the I/O ring to the disk array ring for data flow between the rings separate from the server controller.

33. The server as claimed in claim 32, wherein the I/O ring includes a ring interface device for coupling the at least one I/O access channel to the I/O ring, and at least one additional ring interface device which is coupled to none of the I/O access channels, but which is adapted for coupling to one of the I/O access channels.

34. The server as claimed in claim 32, wherein the disc array ring includes at least two ring interface devices for respectively coupling the at least two disc arrays to the disc array rings, and at least one additional ring interface device which is coupled to less than one of the disc arrays, but which is adapted for coupling to one or more of the disk arrays.

35. The server as claimed in claim 34, wherein the disc array ring further includes a ring controller which causes data received by the disc array ring to be striped across the at least two disc arrays so that different data portions are stored in different ones of those disc arrays, which ring controller stores information indicating which data portions are stored in which of those disc arrays; and wherein when the at least one additional ring interface device is coupled to an additional disc array, the ring controller causes (a) data received by the disc array ring to be striped across the at least two disc arrays and the additional disc array so that different data portions are stored in different ones of those disc arrays, and (b) information indicating which data portions are stored in which of those disc arrays to be stored therein.

* * * * *